US008662876B2

(12) United States Patent
Plantamura

(10) Patent No.: US 8,662,876 B2
(45) Date of Patent: Mar. 4, 2014

(54) INSTALLATION FOR HEATING THE BODIES OF PREFORMS FOR BLOW-MOULDING CONTAINERS

(75) Inventor: Bernard Plantamura, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 538 days.

(21) Appl. No.: 12/136,200

(22) Filed: Jun. 10, 2008

(65) Prior Publication Data
US 2008/0305203 A1 Dec. 11, 2008

(30) Foreign Application Priority Data

Jun. 11, 2007 (FR) ...................... 07 04144

(51) Int. Cl.
*B29C 49/64* (2006.01)
*B29B 13/08* (2006.01)
*B01J 19/08* (2006.01)
*F27B 9/36* (2006.01)
*F21V 7/00* (2006.01)
*H01S 5/06* (2006.01)
*H05B 3/66* (2006.01)

(52) U.S. Cl.
USPC ........ 425/174.4; 425/526; 425/445; 264/458; 264/481; 264/482; 264/492; 264/535; 264/319; 264/903; 219/411

(58) Field of Classification Search
USPC ............... 425/174.4, 445, 526, 407; 219/404, 219/411; 264/458, 481, 482, 492, 535, 319, 264/327, 903
See application file for complete search history.

(56) References Cited

U.S. PATENT DOCUMENTS

| 2,769,117 | A | 10/1956 | Pirillo |
| 3,309,553 | A | 3/1967 | Kroemer |
| 3,626,143 | A | 12/1971 | Fry |
| 3,627,989 | A | 12/1971 | Heidler |
| 3,640,671 | A | 2/1972 | Reilly |
| 3,768,314 | A | 10/1973 | Metzler et al. |

(Continued)

FOREIGN PATENT DOCUMENTS

| CA | 2449508 A1 | 11/2002 |
| CA | 2546517 A1 | 7/2005 |

(Continued)

OTHER PUBLICATIONS

French Preliminary Search Report for FR 0704144 dated Feb. 21, 2008.

(Continued)

*Primary Examiner* — Dimple Bodawala
(74) *Attorney, Agent, or Firm* — Sughrue Mion, PLLC

(57) ABSTRACT

Installation for heating the bodies (1) of thermoplastic preforms (2) with a view to manufacturing containers by blow-molding or stretch-blow-molding, while the preforms (2) are being moved along with their bodies (1) following a predetermined path (T), this installation comprising at least one directional source (5) of electromagnetic radiation directed towards a location (E) on the path (T); the source (5) is inclined by an angle (α) of between about 60° and 10° and preferably less than about 45°, with respect to the tangent (6) to the path (T) at the location (E); thus, the electromagnetic radiation can pass through several preform bodies or parts of bodies without being appreciably reflected back towards the source (5).

9 Claims, 2 Drawing Sheets

(56) References Cited

U.S. PATENT DOCUMENTS

| | | | |
|---|---|---|---|
| 3,950,459 A * | 4/1976 | Seefluth | 264/521 |
| 3,957,618 A | 5/1976 | Spirig | |
| 3,974,016 A | 8/1976 | Bondybey et al. | |
| 3,975,618 A | 8/1976 | Goos et al. | |
| 4,020,232 A | 4/1977 | Kohmura et al. | |
| 4,050,887 A | 9/1977 | Berggren et al. | |
| 4,058,699 A | 11/1977 | van Vloten | |
| 4,079,104 A | 3/1978 | Dickson et al. | |
| 4,097,715 A | 6/1978 | Frizzi | |
| 4,135,077 A | 1/1979 | Wills | |
| 4,147,487 A | 4/1979 | Dickson et al. | |
| 4,163,238 A | 7/1979 | Esak et al. | |
| 4,204,111 A | 5/1980 | Yonko | |
| 4,224,096 A | 9/1980 | Osborne | |
| 4,234,297 A | 11/1980 | Kontz | |
| 4,304,978 A | 12/1981 | Saunders | |
| 4,313,720 A | 2/1982 | Spurr | |
| 4,331,858 A | 5/1982 | Wagner | |
| 4,338,114 A | 7/1982 | Brockway et al. | |
| 4,374,678 A | 2/1983 | Castro | |
| 4,409,455 A | 10/1983 | Belcher et al. | |
| 4,456,811 A | 6/1984 | Hella et al. | |
| 4,459,458 A | 7/1984 | Vetsch et al. | |
| 4,481,405 A | 11/1984 | Malick | |
| 4,486,639 A | 12/1984 | Mittelsteadt | |
| 4,507,538 A | 3/1985 | Brown et al. | |
| 4,606,723 A | 8/1986 | Pasternicki | |
| 4,617,439 A | 10/1986 | Lespinats et al. | |
| 4,665,298 A | 5/1987 | La Rocca | |
| 4,672,169 A | 6/1987 | Chambers | |
| 4,692,583 A | 9/1987 | Kimura et al. | |
| 4,720,480 A | 1/1988 | Ito et al. | |
| 4,754,141 A | 6/1988 | Mindock | |
| 4,810,092 A | 3/1989 | Auth | |
| 4,816,694 A | 3/1989 | Kuppenheimer, Jr. et al. | |
| 4,820,682 A | 4/1989 | Shimomura et al. | |
| 4,820,686 A | 4/1989 | Ito et al. | |
| 4,840,933 A | 6/1989 | Usami et al. | |
| 4,856,978 A | 8/1989 | Voss et al. | |
| 4,857,501 A | 8/1989 | Usami et al. | |
| 4,894,509 A | 1/1990 | Chalco et al. | |
| 4,900,891 A | 2/1990 | Vega et al. | |
| 4,923,847 A | 5/1990 | Ito et al. | |
| 4,924,957 A | 5/1990 | Gigla | |
| 4,929,411 A | 5/1990 | Usami et al. | |
| 4,948,937 A | 8/1990 | Blank et al. | |
| 4,989,791 A | 2/1991 | Ridenour | |
| 4,999,333 A | 3/1991 | Usami et al. | |
| 5,010,231 A | 4/1991 | Huizinga | |
| 5,010,659 A | 4/1991 | Treleven | |
| 5,028,580 A | 7/1991 | Shimomura et al. | |
| 5,066,222 A | 11/1991 | Roos et al. | |
| 5,068,512 A | 11/1991 | Van Geel et al. | |
| 5,110,209 A | 5/1992 | Elshoud et al. | |
| 5,130,292 A | 7/1992 | Ito et al. | |
| 5,146,239 A | 9/1992 | Ono | |
| 5,160,556 A | 11/1992 | Hyde et al. | |
| 5,163,179 A | 11/1992 | Pellegrini | |
| 5,178,990 A | 1/1993 | Satake et al. | |
| 5,206,039 A | 4/1993 | Valyi | |
| 5,208,434 A | 5/1993 | Minamida et al. | |
| 5,246,910 A | 9/1993 | Koshizuka et al. | |
| 5,256,341 A | 10/1993 | Denis et al. | |
| 5,260,258 A | 11/1993 | Ito et al. | |
| 5,260,715 A | 11/1993 | Kishimi | |
| 5,261,415 A | 11/1993 | Dussault | |
| 5,270,285 A | 12/1993 | Ito et al. | |
| 5,308,233 A | 5/1994 | Denis et al. | |
| 5,318,362 A | 6/1994 | Schietinger et al. | |
| 5,322,651 A | 6/1994 | Emmer | |
| 5,349,211 A | 9/1994 | Kato | |
| 5,352,652 A | 10/1994 | Ito et al. | |
| 5,382,441 A | 1/1995 | Lentz et al. | |
| 5,394,492 A | 2/1995 | Hwang | |
| 5,408,488 A | 4/1995 | Kurihara et al. | |
| 5,439,872 A | 8/1995 | Ito et al. | |
| 5,457,299 A | 10/1995 | Blais et al. | |
| 5,501,759 A | 3/1996 | Forman | |
| 5,509,733 A | 4/1996 | Danley | |
| 5,509,796 A | 4/1996 | Di Settembrini | |
| 5,565,119 A | 10/1996 | Behun et al. | |
| 5,589,210 A | 12/1996 | De La Luz Martinez et al. | |
| 5,589,715 A | 12/1996 | Nishitani et al. | |
| 5,618,489 A | 4/1997 | Weissmann | |
| 5,658,667 A | 8/1997 | Yoshida et al. | |
| 5,681,521 A * | 10/1997 | Emmer et al. | 264/521 |
| 5,698,866 A | 12/1997 | Doiron et al. | |
| 5,714,249 A | 2/1998 | Yoshida et al. | |
| 5,740,314 A | 4/1998 | Grimm | |
| 5,741,583 A | 4/1998 | Yoshida | |
| 5,759,200 A | 6/1998 | Azar | |
| 5,773,149 A | 6/1998 | Yoshida et al. | |
| 5,780,524 A | 7/1998 | Olsen | |
| 5,820,820 A | 10/1998 | Pierce | |
| 5,834,313 A | 11/1998 | Lin | |
| 5,865,546 A | 2/1999 | Ganthier et al. | |
| 5,880,710 A | 3/1999 | Jaberi et al. | |
| 5,882,797 A | 3/1999 | Yoshida et al. | |
| 5,883,362 A | 3/1999 | Pettibone et al. | |
| 5,886,313 A | 3/1999 | Krause et al. | |
| 5,888,644 A | 3/1999 | Yoshida et al. | |
| 5,920,677 A * | 7/1999 | Emmer et al. | 392/419 |
| 5,925,710 A | 7/1999 | Wu et al. | |
| 5,935,709 A | 8/1999 | Yoshida | |
| 5,953,356 A | 9/1999 | Botez et al. | |
| 5,975,935 A | 11/1999 | Yamaguchi et al. | |
| 5,976,288 A | 11/1999 | Ekendahl | |
| 5,976,450 A | 11/1999 | Mreijen | |
| 5,980,229 A * | 11/1999 | Collombin | 425/174.4 |
| 5,985,203 A | 11/1999 | Bowkett | |
| RE36,561 E | 2/2000 | Saito et al. | |
| 6,022,920 A | 2/2000 | Maxwell et al. | |
| 6,038,786 A | 3/2000 | Aisenberg et al. | |
| 6,069,345 A | 5/2000 | Westerberg | |
| 6,080,146 A | 6/2000 | Altshuler | |
| 6,080,353 A | 6/2000 | Tsuchiya | |
| 6,104,604 A | 8/2000 | Anderson et al. | |
| 6,113,837 A | 9/2000 | Erickson | |
| 6,113,840 A | 9/2000 | Emmer et al. | |
| 6,146,677 A | 11/2000 | Moreth | |
| 6,174,388 B1 | 1/2001 | Sikka et al. | |
| 6,174,404 B1 | 1/2001 | Klinger | |
| 6,193,931 B1 | 2/2001 | Lin et al. | |
| 6,246,935 B1 | 6/2001 | Buckley | |
| 6,294,769 B1 | 9/2001 | McCarter | |
| 6,357,504 B1 | 3/2002 | Patel et al. | |
| 6,361,301 B1 * | 3/2002 | Scaglotti et al. | 425/174.4 |
| 6,372,318 B1 | 4/2002 | Collette et al. | |
| 6,387,089 B1 | 5/2002 | Kreindel et al. | |
| 6,417,481 B2 | 7/2002 | Chen et al. | |
| 6,437,292 B1 | 8/2002 | Sikka et al. | |
| 6,441,510 B1 | 8/2002 | Hein et al. | |
| 6,444,946 B1 | 9/2002 | Korte | |
| 6,450,941 B1 | 9/2002 | Larson | |
| 6,451,152 B1 | 9/2002 | Holmes et al. | |
| 6,461,929 B1 | 10/2002 | Löbl et al. | |
| 6,476,345 B1 | 11/2002 | Sator | |
| 6,482,672 B1 | 11/2002 | Hoffman et al. | |
| 6,503,586 B1 | 1/2003 | Wu et al. | |
| 6,507,042 B1 | 1/2003 | Mukai et al. | |
| 6,560,893 B1 | 5/2003 | Bakalar | |
| 6,573,527 B1 | 6/2003 | Sugiyama et al. | |
| 6,617,539 B1 | 9/2003 | Koinuma et al. | |
| 6,621,039 B2 | 9/2003 | Wang et al. | |
| 6,638,413 B1 | 10/2003 | Weinberg et al. | |
| 6,667,111 B2 | 12/2003 | Sikka et al. | |
| 6,670,570 B2 | 12/2003 | Giacobbe et al. | |
| 6,710,281 B1 | 3/2004 | Wachnuk | |
| 6,756,697 B2 | 6/2004 | Mizutani et al. | |
| 6,815,206 B2 | 11/2004 | Lin et al. | |
| 6,845,635 B2 | 1/2005 | Watanabe | |
| 6,857,368 B2 | 2/2005 | Pitz | |
| 6,892,927 B2 | 5/2005 | Rumer et al. | |
| 6,905,326 B2 | 6/2005 | Voth et al. | |

(56) References Cited

U.S. PATENT DOCUMENTS

| | | | |
|---|---|---|---|
| 6,949,217 B2 | 9/2005 | Silverbrook | |
| 6,991,704 B2 | 1/2006 | Broadbent | |
| 7,009,140 B2 | 3/2006 | Partio et al. | |
| 7,015,422 B2 | 3/2006 | Timans | |
| 7,060,942 B2 | 6/2006 | Friedl et al. | |
| 7,063,820 B2 | 6/2006 | Goswami | |
| 7,155,876 B2 | 1/2007 | VanderTuin et al. | |
| 7,220,378 B2 | 5/2007 | Cochran et al. | |
| 7,291,811 B2 * | 11/2007 | Evrard et al. | 219/388 |
| 7,307,243 B2 | 12/2007 | Farkas et al. | |
| 7,425,296 B2 | 9/2008 | Cochran et al. | |
| 8,303,290 B2 * | 11/2012 | Feuilloley et al. | 425/174.4 |
| 2001/0019045 A1 | 9/2001 | Chen et al. | |
| 2002/0030307 A1 * | 3/2002 | Deemer et al. | 264/535 |
| 2002/0056707 A1 | 5/2002 | Pinho et al. | |
| 2002/0062161 A1 | 5/2002 | Dusterhoft | |
| 2002/0125234 A1 | 9/2002 | Chen et al. | |
| 2003/0118686 A1 | 6/2003 | Voth et al. | |
| 2004/0010298 A1 | 1/2004 | Altshuler et al. | |
| 2004/0056006 A1 | 3/2004 | Jones et al. | |
| 2004/0161486 A1 | 8/2004 | Pickel | |
| 2004/0231301 A1 | 11/2004 | VanderTuin et al. | |
| 2005/0146065 A1 | 7/2005 | Cochran et al. | |
| 2005/0161866 A1 | 7/2005 | Batlaw | |
| 2005/0193690 A1 | 9/2005 | Shoeneck | |
| 2006/0011604 A1 | 1/2006 | Avrard et al. | |
| 2006/0011898 A1 | 1/2006 | Melzig et al. | |
| 2006/0019846 A1 | 1/2006 | Fan et al. | |
| 2006/0048881 A1 | 3/2006 | Evans et al. | |
| 2006/0056673 A1 | 3/2006 | Dehmeshki | |
| 2006/0097417 A1 | 5/2006 | Emmer | |
| 2006/0118983 A1 * | 6/2006 | Cochran et al. | 264/40.6 |
| 2006/0232674 A1 | 10/2006 | Cochran | |
| 2006/0280825 A1 | 12/2006 | Cochran et al. | |
| 2007/0009635 A1 | 1/2007 | Voisin | |
| 2007/0096352 A1 | 5/2007 | Cochran | |
| 2007/0188023 A1 | 8/2007 | Kraus et al. | |
| 2007/0284788 A1 | 12/2007 | Kurosaki | |
| 2008/0099961 A1 | 5/2008 | Feuilloley et al. | |
| 2008/0102148 A1 * | 5/2008 | Evrard | 425/174.4 |
| 2009/0102083 A1 * | 4/2009 | Cochran et al. | 264/40.6 |
| 2009/0317506 A1 * | 12/2009 | Adriansens | 425/103 |
| 2010/0007061 A1 | 1/2010 | Feuilloley et al. | |
| 2010/0072673 A1 | 3/2010 | Feuilloley | |
| 2010/0127435 A1 * | 5/2010 | Feuilloley | 264/492 |
| 2011/0002677 A1 | 1/2011 | Cochran et al. | |

FOREIGN PATENT DOCUMENTS

| | | | |
|---|---|---|---|
| DE | 3518204 C1 | 10/1986 | |
| DE | 3826841 A1 * | 2/1990 | B29C 49/64 |
| DE | 3339613 C2 | 5/1993 | |
| DE | 4234342 A1 | 4/1994 | |
| DE | 19603974 A1 | 8/1997 | |
| DE | 19750263 A1 | 5/1999 | |
| DE | 10106607 A1 | 9/2002 | |
| DE | 10131620 A1 | 1/2003 | |
| DE | 10149934 A1 | 4/2003 | |
| EP | 0564354 A1 | 10/1993 | |
| EP | 0571262 A1 | 11/1993 | |
| EP | 0620099 A1 | 10/1994 | |
| EP | 0680620 | 11/1995 | |
| EP | 0938962 A2 | 9/1999 | |
| EP | 0939358 A1 | 9/1999 | |
| EP | 1242229 B1 | 2/2004 | |
| EP | 1412684 | 4/2004 | |
| FR | 2561986 A1 | 10/1985 | |
| FR | 2762799 A1 | 11/1998 | |
| FR | 2848906 A1 | 6/2004 | |
| FR | 2872734 A1 | 1/2006 | |
| FR | 2876943 A1 * | 4/2006 | B29C 49/68 |
| FR | 2 878 185 A1 | 5/2006 | |
| FR | 2907684 A1 * | 5/2008 | A61L 2/10 |
| FR | 2976514 A1 * | 6/2011 | B29B 13/02 |
| GB | 2095611 A | 10/1982 | |
| GB | 2165493 A | 4/1986 | |
| GB | 2230740 A | 10/1990 | |
| GB | 2324756 A | 11/1998 | |
| GB | 2399542 A | 9/2004 | |
| JP | 57080030 A | 5/1982 | |
| JP | 59184626 A | 10/1984 | |
| WO | WO 95/14251 A1 | 5/1995 | |
| WO | WO 98/42050 A1 | 9/1998 | |
| WO | WO 00/27576 A1 | 5/2000 | |
| WO | WO 01/39959 A1 | 6/2001 | |
| WO | WO 01/98870 A2 | 12/2001 | |
| WO | WO 02/095382 A1 | 11/2002 | |
| WO | WO 03/002922 A1 | 1/2003 | |
| WO | WO 2004/009318 A1 | 1/2004 | |
| WO | WO 2004/030857 A1 | 4/2004 | |
| WO | WO 2005/065917 A1 | 7/2005 | |
| WO | WO 2005/067591 A2 | 7/2005 | |
| WO | WO 2005/068161 A1 | 7/2005 | |
| WO | WO 2005/123367 A1 | 12/2005 | |
| WO | WO 2006/010694 A1 | 2/2006 | |
| WO | WO 2006/045926 A1 | 5/2006 | |
| WO | 2006/069261 A2 | 6/2006 | |
| WO | WO 2006/056573 A1 | 6/2006 | |
| WO | WO 2006/056673 A1 | 6/2006 | |
| WO | WO 2006/060690 A2 | 6/2006 | |

OTHER PUBLICATIONS

"Combination Therapies Offer New Management Options for Acne and Rosacea," American Academy of Dermatology—Public Resources, Press Release, New York, NY, Oct. 17, 2001.

"Diode Array for Wheel Alignment," CorkOpt Ltd., Date not available.

"Infrared Heat for Glass Processing," Heraeus Noblelight, Aug. 2001.

"Intense Pulsed Light," www.yestheyrefake.net/intense_pulsed_light.htm, Aug. 6, 2003.

"Lasers Offer New Medical and Cosmetic Treatment Options for Patients with Skin of Color," American Academy of Dermatology—Public Resources, Press Release, Chicago, IL, Jul. 27, 2003.

"Low Energy Photon (LEPT)—Light Emitting Diode (LED)—Light Therapy," Allied Light Therapy, www.alliedlighttherapy.com/page1.html., Mar. 3, 2004.

"MID-IR LEDS—1.6 µm . . . 5.0 µm" www.roithner-laser.com/LED_MID_IR.htm., Aug. 4, 2004.

"Rosacea: Pulse-Light Treatments Get the Red Out," UT-Houston—Health Leader, www.uthouston.edu/hLeader/archive/skinhealth/010927/index.html., Mar. 3, 2004.

"Skin Contact Monochromatic Infrared Energy: Technique to Treat Cutaneous Ulcers, Diabetic Neuropathy and Miscellaneous Musculoskeletal Conditions," Blue Cross of California, Medical Policy 2.01.22, Jun. 25, 2003.

Alaiti, S., et al. "Tacrolimus (FK506) ointment for atopic dermatitis: A phase I study in adults and children," Journal of the American Academy of Dermatology, 38 (1), pp. 69-76, Jan. 1998.

Feldman, S.R., et al. "Destructive Procedures are the Standard of Care for Treatment of Actinic Keratoses," Journal of the American Academy of Dermatology, 40 (1), pp. 43-47, Jan. 1999.

Fleischer, A.B., et al., "Procedures for Skin Diseases Performed by Physicians in 1993 and 1994: Analysis of data from the National Ambulatory Medical Care Survey," Journal of the American Academy of Dermatology, Part 1, 37 (5), pp. 719-724, Nov. 1997.

Friedlander, S.F., et al., "Severe and Extensive Atopic Dermatitis in Children as Young as 3 Months," Journal of the American Academy of Dermatology. 46 (3), pp. 387-393, Mar. 2002.

Goings, J. & E. Stephens, "Microchannel cooling ups power capacity for laser-diode bars," Laser Focus World, May 1, 2006.

Gold, M.H. "A Single Center, Open Label Investigator Study of Photodynamic Therapy in the Treatment of Sebaceous Gland Hyperplasia with Topical 20% 5-Aminolevulinic Acid with Visible Blue Light or Intense Pulsed Light," Journal of the American Academy of Dermatology, Abstract P638, Part 2, 50 (3), p. P164, Mar. 2004.

(56) References Cited

OTHER PUBLICATIONS

Goyal, A.K., et al., "Wavelength Beam Combining of Mid-IR Semiconductor Lasers," Lasers and Electro-Optics Society, The 14th Annual Meeting of the IEEE, WQ3 2:15pm-2:30pm, pp. 532-533, 2001.

Hanifin, J.M., et al. "Tbcrolimus Ointment for the Treatment of Atopic Dermatitis in Adult Patients: Part I, Efficacy." Journal of the American Academy of Dermatology. Jan. 2001, part 2, vol. 44, No. 1, pp. S28-S38.

Hecker, D., et al., "Interactions between tazarotene and ultraviolet light," Journal of the American Academy of Dermatology, 41 (6), pp. 927-930, Dec. 1999.

Ivey, A., et al., "Medical Issue: Laser Treateent of Rosacea," Google Answers, May 6, 2003.

Janis, M.D., "On Courts Herding Cats: Contending with the "Written Description" Requirement (and Other Unruly Patent Disclosure Doctrines)," Re-Engineering Patent Law, vol. 2:55, pp. 55-108, 2000.

Jeffes, E.W., et al., "Photodynamic therapy of actinic keratoses with topical aminolevulinic acid hydrochloride and fluorescent blue light," Journal of the American Academy of Dermatology, Abstract, Part 1, 45 (1), Jul. 2001.

Lebwohl, M., et al., "Interactions between calcipotriene and ultraviolet light." Journal of the American Academy of Dermatology, 37 (1), pp. 93-95, Jul. 1997.

Mallozzi, J., "Thin-Disk Lasers Position Themselves in Industry," R&D Magazine, pp. 21-23, Apr. 2005.

Morton, C.A., et al., "The Efficacy of Violet Light in the Treatment of Acne," Journal of the American Academy of Dermatology, Abstract P638, Part 2, 50 (3), p. P15, Mar. 2004.

Nestor, M.S., "Combination Phototherapy and Adapalene in the Treatment of Acne Vulgaris," Journal of the American Academy of Dermatology, Abstract P664, Part 2, 50 (3), p. P170, Mar. 2004.

Paller, A., et al., "A 12-Week Study of Tacrolimus Ointment for the Treatment of Atopic Dermatitis in Pediatric Patients," Journal of the American Academy of Dermatology, 44 (1), pp. S47-S57, Jan. 2001.

Rattunde, M., et al., "Power efficiency of GaSb based 2.0 μm diode Lasers," Lasers and Electro-Optics Society, The 14th Annual Meeting of the IEEE, WQ2 2:00pm-2:15pm, pp. 530-531, 2001.

Soter, N.A., et al., "Tacrolimus ointment for the treatment of atopic dermatitis in adult patients: Part II, Safety," Journal of the American Academy of Dermatology, 44 (1), pp. S39-S46, Jan. 2001.

Tanzi, E.L., et al., "Lasers in dermatology: Four decades of progress," Journal of the American Academy of Dermatology, Abstract, Part 1, 49 (1), Jul. 2003.

Thomson Hybrides, "Saut Technologique Pour Une Nouvelle Structure de Diodes Laser de Puissance," Du Cote de la Rue Descartes, pp. 12-13. (Date not available).

Wagner, J. "Diode Lasers for High-Power Applications at 2 pm," Fraunhofer IAF, Achievement and Results, pp. 24-25, 2001.

Wiese, A., "Potential Savings for Preform Heating by Using NIR Technology," PETnology Europe 2007 Conference Presentation, Mar. 26, 2007.

Wolfe, W.L. & G.J. Zissis, Eds., "The Infrared Handbook: revised edition" Environmental Research Institute of Michigan, pp. 5-56-5-57, 1989.

Woodcock, J., Letter to M. MacDonald, D.A. Jaskot and J.F. Hurst re ANDA from Department of Health & Human Services, Center for Drug Evaluation and Research, Jun. 11, 2002.

Zanolli, M., "Phototherapy treatment of psoriasis today," Journal of the American Academy of Dermatology, Abstract, Part 2, 49 (2), Aug. 2003.

* cited by examiner

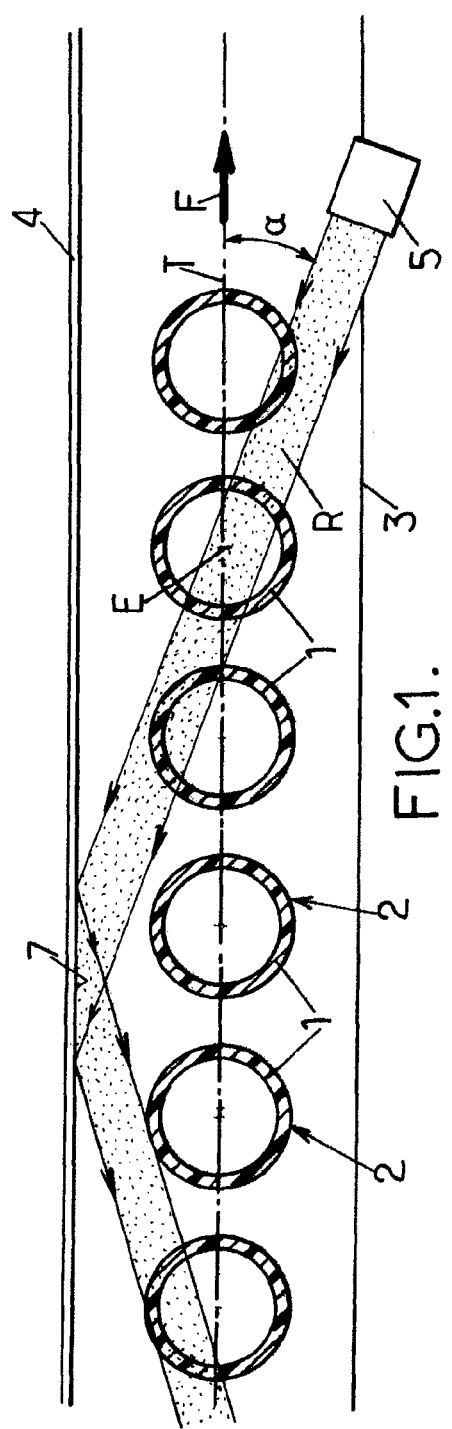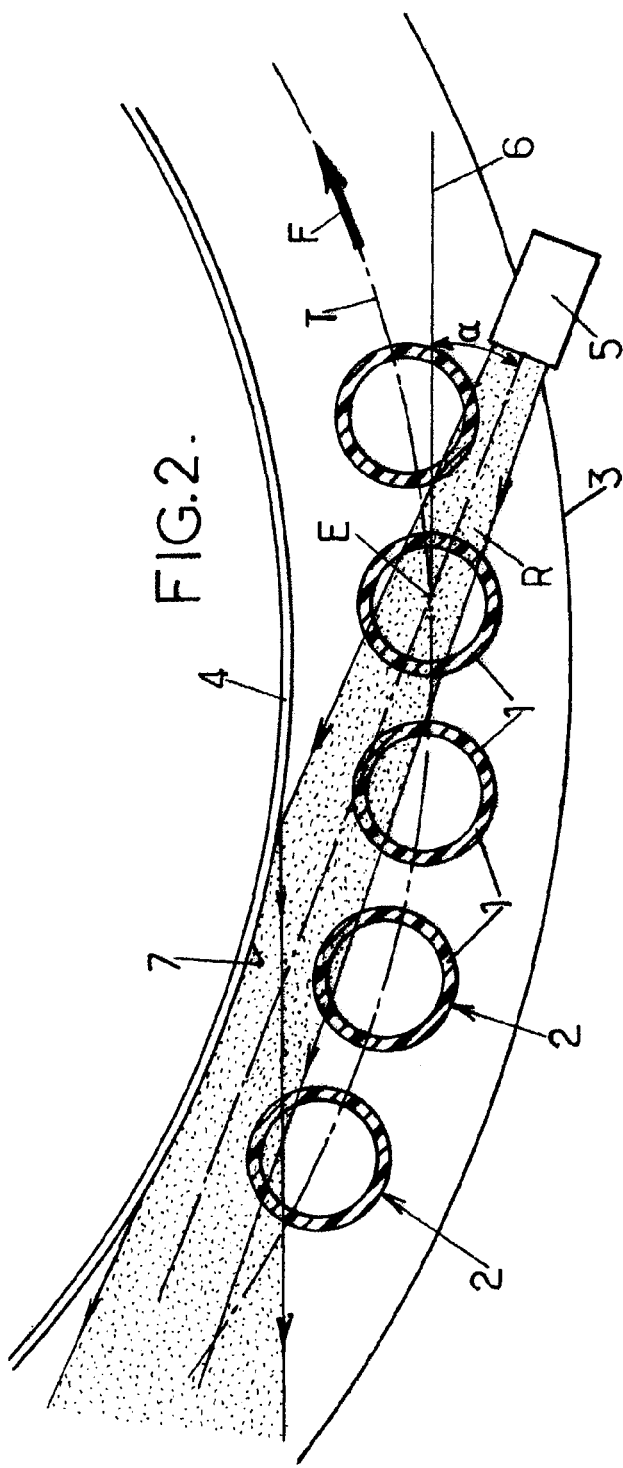

INSTALLATION FOR HEATING THE BODIES OF PREFORMS FOR BLOW-MOULDING CONTAINERS

FIELD OF THE INVENTION

The present invention relates in general to the manufacture of containers made of thermoplastic such as PET by blow-moulding or stretch-blow-moulding preforms, and it relates more specifically to installations for heating the bodies of thermoplastic preforms with a view to manufacturing containers by blow-moulding or stretch-blow-moulding, while said preforms are being moved along in such a way that their respective bodies follow a predetermined path, these heating installations comprising at least one source of infrared electromagnetic radiation positioned to the side of the path followed by the bodies of the preforms and directed towards one location on said path, a reflector being positioned on the other side of the path which is opposite to the side where the source of electromagnetic radiation is positioned.

BACKGROUND OF THE INVENTION

Installations for manufacturing thermoplastic containers comprise, for heating the preforms prior to the blow-moulding or stretch-blow-moulding stage, heating installations for example of the tunnel oven type which traditionally are fitted with incandescent infrared radiation lamps.

Attempts have, however, been made to employ heating means of a different type such as heating using coherent infrared electromagnetic radiation of the laser radiation type. Such a radiation offers the advantage of being more directional and of allowing the bodies of the preforms to be heated far more precisely and in a more localized manner than can be achieved with traditional infrared radiation heating means the angular spread of which is relatively great; it also offers the advantage of more uniform absorption of the heat within the thickness of the wall of the preform.

In a first possible embodiment (for example FIGS. 6 and 7 of document FR 2 878 185), the or each source of coherent infrared electromagnetic radiation is directed substantially at right angles to the path followed by the bodies of the preforms. Such an arrangement is admittedly satisfactory as far as the heating of the bodies of the preforms is concerned, particularly with regard to the selectivity of this heating when such selectivity is desired, but also presents disadvantages.

One disadvantage with this known arrangement lies in the fact that the radiation passes through each body while heating the material thereof, but is not fully absorbed. The fraction of the radiation that has not been absorbed is reflected by a reflector positioned opposite the source and is returned towards the bodies of the preforms and towards the sources. However, this reflection is accompanied by partial absorption and by heating of the reflector, leading to a loss of energy. As a result, the efficiency of such a heating arrangement is not optimal.

What is more, a proportion of the reflected fraction of the radiation may return to the source, and this is detrimental to the life of this source.

Another disadvantage with this known arrangement lies in the fact that, when a space between the bodies of two consecutive preforms passes in front of the source of electromagnetic radiation, all of the radiation emitted thereby then reaches the reflector and, for the most part, is reflected back towards the source, with a risk of damaging, or even of destroying, the latter. Admittedly, it might be possible to contrive for the radiation to be emitted only for the time during which the body of a preform is moved in front of the source and for the emission of radiation to be interrupted when it is a space between two consecutive preform bodies that is moving in front of the source. Such a solution could be implemented, for example, by sequential excitation of the source which would then operate discontinuously, synchronized with the rate of travel of the preforms. This would, however, result in an installation that was complicated and expensive to produce and to keep in correct working order.

In another possible embodiment (for example FIGS. 9 and 10 of the same document FR 2 878 185), the or each source of coherent infrared electromagnetic radiation is directed substantially along the path followed by the bodies of the preforms so that the radiation passes in succession through a plurality of consecutive preform bodies. An arrangement such as this is admittedly satisfactory in terms of the actual heating of the preform bodies and the efficiency may be regarded to be better than that of the previous solution. However, this known arrangement has a disadvantage inherent to the fact that the path of the preform bodies has to be diverted away from the source just upstream thereof, or in other words, that the conveyor conveying the preforms needs to turn through a bend in front of the source.

Furthermore, the absorption of electromagnetic radiation varies with the material of which the preforms are made, and an installation in which the distance between the sources of radiation is fixed is not capable with good efficiency of processing a great many types of preform made of thermoplastics of different properties and which behave in different ways.

The result of this is that, if several sources need to be installed one after another in order to obtain the required heating power, the preform conveyor needs to have as many deviation means (bends and/or transfer wheels) to divert the path of the preform body on each occasion. Transferring the preforms along a winding path is penalizing on two accounts: firstly, because the conveyor becomes complicated and expensive to produce and secondly because the presence of the bends means that the preforms cannot travel at speeds that are as high as might be desired.

SUMMARY OF THE INVENTION

It is an object of the invention to propose an improved technical solution which, to the greatest possible extent, sets aside the disadvantages displayed by the already known solutions and in particular allows the use of infrared electromagnetic radiation for the purposes of heating the thermoplastic preform bodies with an improved efficiency and without risk to the source of electromagnetic radiation, it being necessary in addition for these advantages to be obtainable without any appreciable additional cost of the installation.

To these ends, the invention provides an installation for heating the bodies of thermoplastic preforms with a view to manufacturing containers by blow-moulding or stretch-blow-moulding, as set out in the preamble and which, being arranged in accordance with the invention, is characterized in that said source of infrared electromagnetic radiation is a directional source inclined by an angle of between about 60° and 10° with respect to the tangent to the said path at said location.

By virtue of such an arrangement, it becomes sure that the electromagnetic radiation is not reflected or is reflected only slightly towards said source of electromagnetic radiation or towards an adjacent source of electromagnetic radiation: the reflected radiation will then reach the source from the side, striking the active part thereof (particularly the frontal face thereof) at a small angle of incidence and almost in the manner of a glancing blow, without this being able to lead to appreciable damage to the source.

In addition, the angular range mentioned makes it possible to ensure that, through an appropriate choice of the angle α according to the diameter of the preforms and the distance by which they are spaced apart on the conveyor, at least most of the radiation always reaches at least one preform body and/or one or more parts of preform bodies. In other words, the space left between the bodies of two successive preforms, viewed from the source, remains small, or is preferably zero, so that only a small amount of the radiation at most can pass between consecutive preforms and reach the reflector positioned on the wall opposite.

In this context, it proves preferable for said angle to be less than about 45°. By virtue of such an arrangement, it is possible to ensure that the electromagnetic radiation is not reflected towards said source of electromagnetic radiation or towards an adjacent source of electromagnetic radiation: the reflected radiation will therefore reach the source laterally, striking the housing or casing thereof, but will not be able to reach the active part on the frontal face of the actual emitting part proper of the source.

In addition, the possibility of the radiation being completely or partially intercepted by the successive preform bodies or body parts are appreciably improved over the solutions explained above.

With a view to optimizing the efficiency of the installation, it is desirable for all of the electromagnetic radiation emitted by the directional source to be able always to reach at least one preform body or several parts of preform bodies irrespective of the relative positions of the preforms as they move in front of the source. This condition will be more easily satisfied for a greater number of preform sizes of medium or large diameter and with various spacing between successive preforms if the directional source of electromagnetic radiation is inclined by an angle of between about 20° and 31° with respect to the tangent to the said path at said location.

By contrast, in the case of relatively small-diameter preforms (for example those with a diameter of an order of magnitude of about 15 mm), provision may be made for said angle of inclination to be between about 12° and 20°.

In addition, by virtue of these arrangements, not only it can be guaranteed that all of the electromagnetic radiation emitted by the directional source will always reach a preform body and/or several parts of preform bodies, but also it can be guaranteed that the electromagnetic radiation, because of its angle of inclination with respect to the line of travel of the preforms, will pass in succession through several preform bodies or parts of body situated one after another so that the ability of the electromagnetic radiation to supply heat energy is exploited to the full.

It is notable that these arrangements are very simple to implement and that they do not lead to fundamental changes to the design and arrangement of the heating installation. Finally, implementing them in practical terms does not involve the addition of appreciable additional equipment and relies essentially on a geometric redistribution of certain components.

The path followed by the bodies of the preforms may be curved at said location, and it is then desirable for the directional source of electromagnetic radiation to be positioned on the convex side of said path. However, the commonest configuration in practice is for the path followed by the bodies of the preforms to be substantially straight at said location considered and the directional source of electromagnetic radiation can then be positioned with equal preference on either side of said path.

Likewise, provision may be made for the directional source of electromagnetic radiation to face in the direction opposite to the direction of travel of the preforms, or alternatively, more generally, for the directional source of electromagnetic radiation to face, on the other hand, in the direction of travel of the preforms. It should be noted that one advantageous embodiment may be to combine these two arrangements and then contrive for the installation to comprise at least two directional sources of electromagnetic radiation, for at least one directional source of electromagnetic radiation to face in the direction of travel of the preforms and for at least one other directional source of electromagnetic radiation, positioned downstream of the previous one, for its part to face in the direction opposite to the direction of travel of the preforms: thus, in one exemplary application of this arrangement which can then be employed at the exit from the oven, it is possible to provide one last burst of thermal energy to a predetermined location of a preform body or part of a preform body just as this preform leaves the heating installation and immediately before it enters the blow-moulding installation, so that the body of the preform can be deformed under optimal conditions even in regions thereof that are difficult to deform.

Still in the context of practical applications, it is possible for the directional source of electromagnetic radiation to be substantially monochromatic (or almost monochromatic, that is to say to cover a narrow band of electromagnetic frequencies), it also being advantageously possible for the radiation to be collimated. In concrete terms, said directional source of electromagnetic radiation may be a laser source, particularly a laser diode. Of course, several diodes may be grouped together if need be to constitute a directional source of a shape and spread suited to the requirements.

BRIEF DESCRIPTION OF THE DRAWINGS

The invention will be better understood from reading about certain embodiments which are given solely by way of non limiting examples. In this description, reference is made to the attached drawings in which:

FIG. 1 is a highly diagrammatic depiction, in a view from above, of one preferred embodiment of the arrangements of the invention;

FIG. 2 is a highly schematic depiction, in a view from above, of another possible embodiment of the arrangements of the invention.

DETAILED DESCRIPTION OF THE INVENTION

Figure 3:
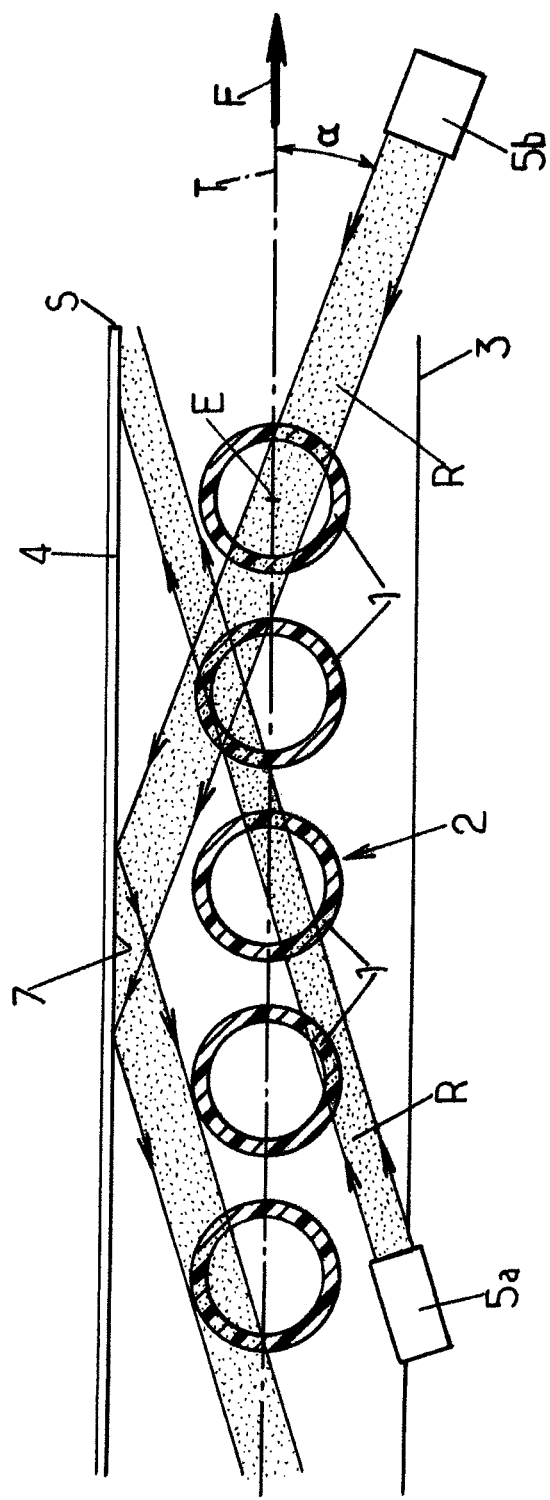
FIG. 3 is a highly schematic depiction, in a view from above, of one concrete example of the location of several directional sources of substantially monochromatic infrared electromagnetic radiation in the context of the preferred embodiment of FIG. 1.

Referring first of all to FIG. 1, there is shown, in a highly schematic form and in a view from above, just one part, needed for understanding the invention, of an installation for heating the bodies 1 of thermoplastic preforms 2 with a view to manufacturing containers using a blow-moulding or stretch-blow-moulding process.

Within this heating installation, the preforms 2 are moved along by an appropriate conveyor (not shown) in such a way that their respective bodies 1 follow a predetermined path T. The direction of travel of the preforms 2 is indicted by the arrow F. In high-capacity installations in which the preforms are moved along at high speed, the heating installation is generally in the form of at least one tunnel oven flanked laterally by two side walls denoted by the references 3 and 4 respectively in FIG. 1.

FIG. 1 illustrates, by way of example, a conventional set up of a tunnel oven that is in widespread use and which consists in the tunnel oven being straight at least in part and in the path T that the preforms 2 follow being straight in this portion of the oven.

In the context at which the invention is aimed, the heating installation comprises at least one source 5 of infrared electromagnetic radiation which is a directional source positioned to the side of the path T followed by the bodies 1 of the preforms 2 and facing towards a location E on the path T followed by the bodies 1 of the preforms 2. The infrared electromagnetic radiation R emitted by the directional source 5 may be substantially monochromatic (or almost monochromatic, that is to say may cover a narrow band of electromagnetic frequencies), it also being possible for the radiation advantageously to be collimated. As illustrated in FIG. 1, the directional source 5 is supported by one of the walls of the oven, for example the wall 3, and on the other side of the path T a reflector 7 extends at least at the location on the wall 4 opposite where the direction of propagation of the radiation R reaches the said wall 4.

The directional source 5 of electromagnetic radiation is inclined by an angle α of between about 60° and 10° with respect to the tangent 6 to said path T at said location E so that the electromagnetic radiation cannot be reflected or can be reflected only a little towards the source 5 of electromagnetic radiation or towards an adjacent source; the reflected radiation therefore reaches the source laterally but reaches the active part thereof (that is to say the frontal face thereof) only at a small angle of incidence and almost in the manner of a glancing blow: the source cannot therefore sustain significant damage or heating liable to disturb its correct operation.

In addition, said angular range makes sure that, through an appropriate choice of the angle α defined by the diameter of the preforms and the spacing between them on the conveyor, at least most of the radiation always reaches at least one preform body or several parts of preform bodies. In other words, the space between the bodies of two successive preforms, viewed from the source, remains small, or is preferably zero, which means that a small amount of the radiation at most can pass between consecutive preforms and reach the reflector positioned on the wall opposite.

By way of a concrete example, in the case of the processing of large-diameter preforms (for example those of a diameter of an order of magnitude of about 40 mm), the successive preform bodies or parts of bodies will intercept all of the electromagnetic radiation whereas, when preforms of medium diameter (for example those of a diameter of an order of magnitude of about 20 mm) are being processed, a fraction of the radiation will admittedly be able to pass through the space left between two consecutive preforms but this will then be a relatively small fraction of the radiation and will not present an appreciable disadvantage.

As a preference, provision may be made for the angle α to remain less than about 45° so that the electromagnetic radiation can then not be reflected, even in part, towards the source 5 of electromagnetic radiation or towards an adjacent source; in other words, the electromagnetic radiation cannot be reflected towards the active part (in other words the frontal face) of the said source 5 of electromagnetic radiation or of an adjacent source, it being possible on the other hand for the radiation reflected by the reflector 7 to reach the source 5 or another source laterally, striking the housing or casing thereof without damage to the actual active part proper of the source.

With a view to optimizing the efficiency of the installation, it is desirable for all of the electromagnetic radiation emitted by the directional source to be able always to reach at least one preform body or several parts of preform bodies irrespective of the relative positions of the preforms as they file past the source. This condition will be met all the more easily for a large number of preform sizes of medium or large diameter (for example diameters varying about an order of magnitude of about 20 to 45 mm) and various spacings between successive preforms if the directional source of electromagnetic radiation is inclined by an angle of between about 20° and 31° with respect to the tangent to said path at said location.

If the practical situation of heating installations currently in production by the Applicant Company is considered by way of example, the preforms are separated from one another with a spacing of 40 mm or 50 mm; installations arranged with a spacing of 40 mm are able to accept preforms which, depending on model type, may have bodies of diameters ranging between about 19 and 36 mm; installations set up with a spacing of 50 mm can accept preforms which, depending on model type, have bodies with diameters ranging between about 19 and 43 mm. It will then be possible to guarantee that all of the electromagnetic radiation emitted by a directional source will always reach a preform body or parts of preform bodies if the angle α, as mentioned hereinabove, is between about 20° and 31°.

By contrast, in the case of relatively small-diameter preforms (for example those with a diameter of an order of magnitude of approximately 15 mm), provision may be made for said angle of inclination to range between about 12° and 20°.

In the configuration of a straight tunnel oven or of a straight tunnel oven portion as shown in FIG. 1, the directional source 5 of electromagnetic radiation may be positioned with equal preference on either side of the path T, in other words, the directional source 5 may be supported by the wall 4 and the reflection means by the wall 3, depending on the installation layout requirements; it is equally possible to envisage mounting several directional sources on both walls 3, 4 at the same time, taking care that each directional source 5 does not receive any incident or reflected radiation from one or more of the other sources.

FIG. 2 depicts a different configuration which, in practice, is less commonplace, and which involves the path T followed by the bodies 1 of the preforms 2 being curved (for example substantially circular as illustrated in FIG. 2) at the said location E. In this case, the directional source 5 of electromagnetic radiation is inclined by said angle α with respect to the tangent 6 to said path T at the location E.

To draw a parallel with the depiction of FIG. 1, the heating installation is then assumed to comprise a curved tunnel oven the side walls 3, 4 of which are curved. This in particular means that the reflector means supported by the walls 4 are, in the depiction adopted in FIG. 2, of the convex reflector type. In a configuration such as this, it is advantageous for the directional source 5 of electromagnetic radiation to be positioned on the convex side of the path T so as to be sure that it will not receive any reflected radiation.

Of course, it remains possible to position the directional source 5 of electromagnetic radiation on the concave side of the path T. However, the reflector means will then also become reflector means of the concave type and the radiation will be reflected in the form of a broadly divergent beam. It is then more complicated, from a structural standpoint, to ensure that none of this reflected radiation reaches the source 5 or some other source 5, the difficulty being all the greater if several sources are spread out along the path T.

It is possible to contrive for the directional source 5 of electromagnetic radiation to face in the direction opposite to the direction F of travel of the preforms 2, as shown in FIGS. 1 and 2, but it is also entirely conceivable to contrive for the directional source 5 of electromagnetic radiation to face in the direction F of travel of the preforms 2. One advantageous solution may be to combine the two options and to envisage, as shown in FIG. 3 in the configuration of a straight oven or oven portion, the following arrangements:

the heating installation comprises at least two directional sources 5 of electromagnetic radiation, among these, at least one directional source 5a of electromagnetic radiation faces in the direction F of travel of the preforms 2, and at least one other directional source 5b of electromagnetic radiation, positioned downstream (considering the direction F of travel of the preforms) faces in the direction opposite to the direction F of travel of the preforms 2.

An arrangement such as this may find a particular, although nonexclusive, application which is of advantage at the exit S from the oven: the directional source or sources 5b facing the direction opposite to the direction of travel of the preforms are able to finalize the provision of additional heat energy just at the moment when the preforms reach the exit S from the oven and are grasped by the transfer means that will take them to their respective moulds, in other words, very shortly before they are placed in the respective moulds.

It will also be emphasized that, again with a view to reducing the losses as far as possible, it is conceivable to position other reflectors (not shown in the drawings) on the wall 3 that supports the source 5; when several sources 5 are used positioned in stages along the path T, these additional reflectors may in particular be positioned between the sources 5.

In the context of the invention, the directional source 5 of electromagnetic radiation may be a laser source, typically in the form of at least one laser diode which occupies a small amount of space and is commonly available nowadays.

The electromagnetic radiation may be shaped in any appropriate way to suit the application and the result that is to be obtained, particularly in terms of the spread, the position and the shape of the region that is to be heated on the body of the preforms. Thus, the beam of electromagnetic radiation may advantageously be collimated to form a beam with substantially parallel edges as shown by way of example in FIG. 1, or alternatively may be divergent as shown by way of example in FIG. 2.

In practice, several juxtaposed laser diodes will generally be employed to form a beam of a shape suited to the heating to be applied to the bodies of the preforms. In particular, a horizontal flat beam may be produced as shown by way of example in FIGS. 1 and 2, but it will be just as easy to form a vertical flat beam (not shown) or flat beam that is inclined, if necessary.

Use of the heating means arranged according to the invention may give rise to various heating installation design options. Thus, it is conceivable for the entire heating installation to be constructed with directional sources arranged according to the invention. However, because the directional sources currently available are laser sources which are relatively expensive, it is conceivable for only one or more parts of the heating installation to be formed in accordance with the invention, the remainder of the installation remaining equipped with less expensive traditional lamps; in particular, provision may be made for the last part, near the exit, of the heating installation to be equipped in accordance with the invention as explained above.

It is also emphasized that, the term source is intended to denote not only the actual emitter of radiation proper but also, if appropriate, all of the components and auxiliary devices that may be associated with the emitter for generating the radiation in the desired form at the required location on the wall 3 of the oven (for example the collimator device, the optical guide such as optical fibre(s) that allow the radiation to be projected to the desired location when the emitter is positioned remotely, etc).

What is claimed is:

1. Installation for heating bodies of thermoplastic preforms with a view to manufacturing containers by blow-moulding or stretch-blow-moulding, while said preforms are being moved along in such a way that their respective bodies follow a predetermined straight path, the installation comprising:

a tunnel oven flanked laterally by a first side wall and a second side wall respectively disposed on each side of said predetermined straight path, a source of infrared electromagnetic radiation positioned to the side of the predetermined straight path followed by the bodies of the preforms, said source of infrared electromagnetic radiation having a plurality of juxtaposed laser diodes being supported by the first side wall and directed towards a location on said predetermined straight path, and a straight reflector which is positioned on the second side wall opposite to the first side wall and extends at least at a location on the second side wall where a direction of propagation of the radiation reaches said second side wall and reflects from said second side wall in the form of a broadly divergent beam or a beam with substantially parallel edges for heating the bodies of preforms, while said preforms being moved along the path of the tunnel, wherein the source of infrared electromagnetic radiation comprises a first directional source inclined by an angle of between about 60° and 10° with respect to a tangent to said predetermined straight path at the location toward which said source of infrared electromagnetic radiation is directed.

2. The installation for heating according to claim 1, wherein said angle is less than about 45°.

3. The installation for heating according to claim 2, wherein said angle is between about 20° and 31°.

4. The installation for heating according to claim 2, wherein the angle is between about 12° and 20°.

5. The installation for heating according to claim 1, wherein the first directional source of infrared electromagnetic radiation faces in the direction of travel of the preforms.

6. The installation for heating according to claim 1, wherein the first directional source of infrared electromagnetic radiation is arranged to face in a direction opposite to the direction of travel of the preforms.

7. The installation for heating according to claim 1, wherein the source of infrared electromagnetic radiation further comprises a second directional source of infrared electromagnetic radiation, wherein the first directional source of infrared electromagnetic radiation faces in the direction of travel of the preforms, and the second directional source of infrared electromagnetic radiation faces in the direction opposite to the direction of travel of the preforms.

8. Installation for heating bodies of thermoplastic preforms for manufacturing containers by blow-moulding or stretch-blow-moulding, while said preforms are moved along in such a way that respective bodies of the preforms follow a predetermined path, the installation comprising:

at least one tunnel oven flanked laterally by a first side wall and a second side wall respectively disposed on each side of said predetermined path, at least one source of infrared electromagnetic radiation positioned on a side of the predetermined path followed by the bodies of the preforms, said source of infrared electromagnetic radiation having of a plurality of juxtaposed laser diodes being supported by the first side wall and directed toward a location on said predetermined path, and a reflector which is positioned on the second side wall opposite the first side wall and extends at least at a location on the second side wall where a direction of propagation of the radiation reaches said second side wall and reflects from said second side wall in the form of a broadly divergent beam or a beam with substantially parallel edges for heating the bodies of preforms, while said preforms being moved along the path of the tunnel, said first and second side walls are curved such that at least a portion of the predetermined path in said tunnel oven, including where said source of infrared electromagnetic radiation is directed, is curved, said source of infrared electromagnetic radiation is positioned on a convex side of said predetermined path, said reflector is convex and positioned on an inside surface of the second side wall, the inside surface is convex relative to the direction of propagation of the radiation from the source of infrared electromagnetic radiation positioned on the convex side of said predetermined path, and the source of infrared electromagnetic radiation is a directional source inclined by an angle of between about 60° and 10° with respect to a tangent to said predetermined path at the location toward which said source of infrared electromagnetic radiation is directed.

9. Installation for heating bodies of thermoplastic preforms for manufacturing containers by blow-moulding or stretch-blow-moulding, while said preforms are being moved along in such a way that respective bodies of the preforms follow a predetermined path, the installation comprising:

at least one tunnel oven flanked laterally by first side wall and a second side wall respectively disposed on each side of said predetermined path, at least one source of infrared electromagnetic radiation positioned to the side of the predetermined path followed by the bodies of the preforms, said source of infrared electromagnetic radiation having of a plurality of juxtaposed laser diodes being supported by the first side wall and directed toward a location on said predetermined path, and a reflector which is positioned on the second side wall opposite the first wall and extends at least at a location on the second side wall where a direction of propagation of the radiation reaches said second wall and reflects from said second side wall in the form of a broadly divergent beam or a beam with substantially parallel edges for heating the bodies of preforms, while said preforms being moved along the path of the tunnel, wherein said tunnel oven is curved, said first and second side walls are curved such that at least a portion of the predetermined path in said tunnel oven, including where said source of infrared electromagnetic radiation is directed, is curved, said source of infrared electromagnetic radiation is positioned on a concave side of said predetermined path, said reflector is concave and is positioned on an inside surface of the second side wall, the inside surface is concave relative to the direction of propagation of the radiation from the source of infrared electromagnetic radiation positioned on the concave side of said predetermined path, and the source of infrared electromagnetic radiation is a directional source inclined by an angle of between about 60° and 10° with respect to a tangent to said predetermined path at the location toward which said source of infrared electromagnetic radiation is directed.

* * * * *